(12) United States Patent
Shin et al.

(10) Patent No.: US 10,983,691 B2
(45) Date of Patent: Apr. 20, 2021

(54) TERMINAL, VEHICLE HAVING THE TERMINAL, AND METHOD FOR CONTROLLING THE VEHICLE

(71) Applicants: Hyundai Motor Company, Seoul (KR); Kia Motors Corporation, Seoul (KR)

(72) Inventors: Huiwon Shin, Gyeonggi-do (KR); Singu Kim, Gyeonggi-do (KR); Dong Woo Kim, Gyeonggi-do (KR); Sang Woo Ji, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/699,215

(22) Filed: Nov. 29, 2019

(65) Prior Publication Data
US 2020/0218442 A1    Jul. 9, 2020

(30) Foreign Application Priority Data
Jan. 7, 2019    (KR) .......................... 10-2019-0001746

(51) Int. Cl.
*G06F 3/0488* (2013.01)
*G06F 3/0481* (2013.01)
(Continued)

(52) U.S. Cl.
CPC .......... *G06F 3/04883* (2013.01); *B60K 37/06* (2013.01); *G06F 3/013* (2013.01);
(Continued)

(58) Field of Classification Search
CPC .......... G06F 3/017; G06F 3/013; G06F 3/011; G06F 3/04883; G06F 3/0488; G06F 3/005; G06F 3/0481; G06F 3/0482; G06F 3/04842; G06F 3/04886; G06F 3/04815; G06F 3/0304; G06F 3/04845;
(Continued)

(56) References Cited

U.S. PATENT DOCUMENTS

2010/0042950 A1*    2/2010    Hsieh .................... G06F 3/0488
                                                                          715/835
2013/0311946 A1*    11/2013    Kwon .................. G06Q 10/109
                                                                          715/811
(Continued)

FOREIGN PATENT DOCUMENTS

WO    WO-2019177059 A1 *    9/2019    ............... B60Q 3/14

*Primary Examiner* — Dong Hui Liang
(74) *Attorney, Agent, or Firm* — Mintz Levin Cohn Ferris Glovsky; Peter F. Corless

(57) ABSTRACT

A terminal is provided to recognize a touch input and a gesture input intended by a user. A vehicle includes the terminal configured to display buttons to be selected by a user, and receive a touch input as user input. An image input receives an image of the user for receiving a gesture input as the user input and a controller divides an area of the terminal into a first area and a second area. The controller determines a button selected by the user among buttons displayed in the first area based on the touch signal output by the touch input, and determines a button selected by the user among buttons displayed in the second area based on a finger image and an eye image in the image.

23 Claims, 16 Drawing Sheets

(51) Int. Cl.
   *G06F 3/01*     (2006.01)
   *G06F 3/041*    (2006.01)
   *G06K 9/00*     (2006.01)
   *B60K 37/06*    (2006.01)

(52) U.S. Cl.
   CPC ...... *G06F 3/04186* (2019.05); *G06F 3/04817* (2013.01); *G06K 9/00201* (2013.01); *G06K 9/00832* (2013.01); *B60K 2370/146* (2019.05); *B60K 2370/1438* (2019.05); *B60K 2370/741* (2019.05)

(58) Field of Classification Search
   CPC ...... G06F 3/041; G06F 3/048; G06F 3/04817; G06F 3/0425; G06F 3/0416; G06F 3/044; G06F 3/04108
   See application file for complete search history.

(56) References Cited

U.S. PATENT DOCUMENTS

| | | | |
|---|---|---|---|
| 2014/0223353 A1* | 8/2014 | Kirkham | H04M 1/72586 715/771 |
| 2015/0185958 A1* | 7/2015 | Park | G06F 1/3265 345/175 |
| 2016/0179205 A1* | 6/2016 | Katz | G06F 3/013 345/156 |
| 2017/0153792 A1* | 6/2017 | Kapoor | G06F 3/0486 |
| 2019/0163268 A1* | 5/2019 | Shin | H04N 13/344 |
| 2020/0055396 A1* | 2/2020 | Mejia Gonzalez | G06F 3/04886 |

* cited by examiner

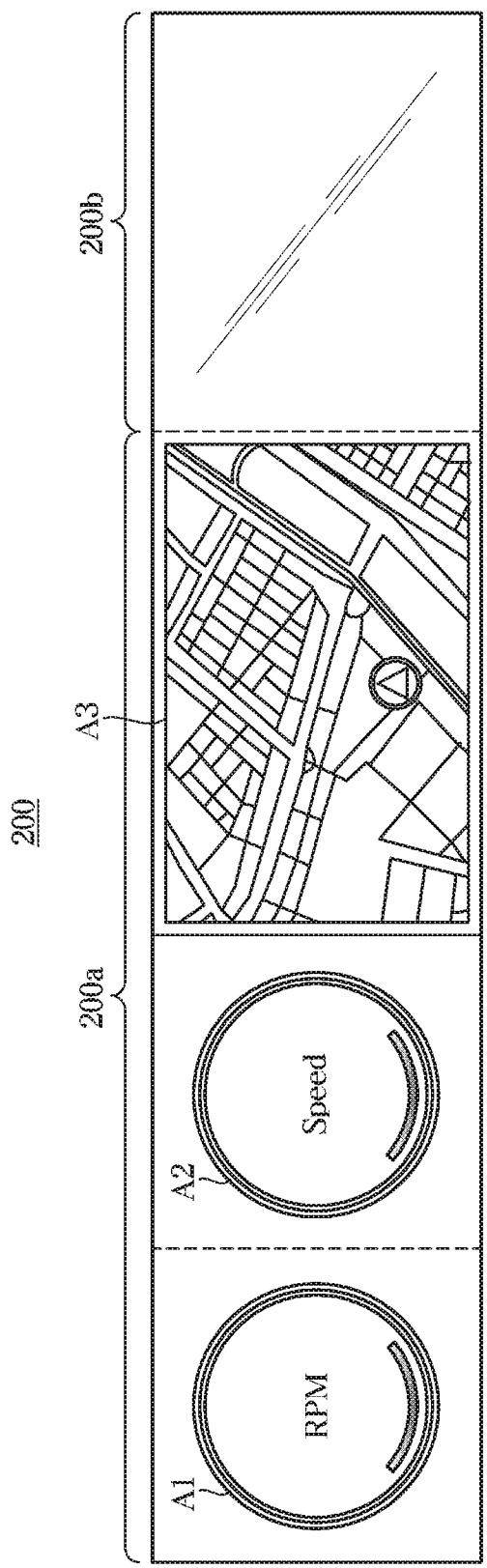

TERMINAL, VEHICLE HAVING THE TERMINAL, AND METHOD FOR CONTROLLING THE VEHICLE

CROSS-REFERENCE TO RELATED APPLICATION(S)

This application claims priority to and the benefit of Korean Patent Application No. 10-2019-0001746, filed on Jan. 7, 2019, the disclosure of which is incorporated by reference in its entirety.

BACKGROUND

Field of the Disclosure

The disclosure relate to a terminal capable of recognizing a touch input and a gesture input intended by a user, a vehicle having the terminal, and a method for controlling the vehicle.

Description of Related Art

In addition to a driving function, vehicles also includes additional functions such as audio function, video function, navigation, air conditioning system, seat control, and lighting control for the user convenience. The vehicle includes an electronic device for performing respective functions, and a terminal for receiving an operation command of each electronic device and displaying operation information of each electronic device.

The terminal includes an input device that receives an operation command of at least one electronic device, and a display that displays operation information of the at least one electronic device and traveling information. The input device and the display of the terminal are integrally disposed in one body, or are arranged separately from each other. The input device of the terminal is implemented by at least one of a hard key type, a touch type, a gesture recognition type, and a voice recognition type.

When applying the hard key type to input device, a physically large space may be consumed to be provided with a plurality of hard keys. In addition, there may be problems of increasing load of manipulation of the user to receive an operation command by a few hard keys, and in addition, at the night, lighting button, such as, light-emitting diode (LED), and button instrument may be needed for the identification of the physical buttons, and thereby increasing manufacturing cost of the input device of the terminal.

When applying the touch screen type to the input device of the terminal, drivers may touch each time the terminal to input an operation command. It may be difficult for a driver's hand to reach the touch screen if the distance between the driver and the touch screen is long. When applying the voice recognition type to the input device of the terminal, a conversation between passengers, a telephone call, and a voice included in music being played may be misrecognized as a voice for function control of the vehicle.

Additionally, when applying the gesture recognition type to the input device of the terminal, an operation command may be misrecognized in the motion of the hand being unnatural gesture or unintended hand motion. The driver must learn the gesture of the operation command for controlling the functions of the plurality of electronic devices. There is also a limitation in expressing each operation command as a different gesture.

SUMMARY

Therefore, an aspect of the present disclosure provides a terminal that may include a first recognition unit configured to recognize a user input based on a touched position and a second recognition unit configured to recognize a user input based on a position on a straight line connecting an eye of the user and a fingertip of the user, a vehicle having the terminal, and a method for controlling the vehicle. Another aspect of the present disclosure provides a terminal capable of setting a first area to recognize a touch input and a second area to recognize a gesture input, and setting a position of a button to be placed in the second area, a vehicle having the terminal, and a method for controlling the vehicle. Additional aspects of the present disclosure will be set forth in part in the description which follows and, in part, will be obvious from the description, or may be learned by practice of the present disclosure.

In accordance with one aspect of the present disclosure, a terminal may include: a display configured to display a plurality of buttons selectable by a user; a touch input disposed integrally on a display surface of the display, configured to generate a touch signal at a touched point and output the generated touch signal; an image input configured to receive an image of the user; and a controller configured to divide an area of the display into a first area and a second area, determine a button selected by the user among buttons displayed in the first area based on the touch signal output by the touch input, and determine a button selected by the user among buttons displayed in the second area based on a finger image and an eye image in the image.

When determining the button selected by the user among the buttons displayed in the second area, the controller may be configured to generate a point of a fingertip based on the finger image, generate a point of a pupil based on the eye image, generate a straight line connecting the point of the fingertip with the point of the pupil, determine a position corresponding to a direction in which the generated straight line is directed, and determine the button disposed at the determined position.

The controller may be configured to recognize an activity or motion range of an arm and a hand of the user based on the image and set a rich zone based on the recognized activity range, and divide the area of the display into the first area and the second area based on the set rich zone. The controller may also be configured to operate the display to display an image of the determined button among the buttons displayed in the second area larger than an image of the remaining buttons displayed in the second area. The controller may be configured to operate the display to display a color of an image of the determined button among the buttons displayed in the second area differently from a color of an image of the remaining buttons displayed in the second area.

Further, the controller may be configured to divide the second area into a plurality of button areas based on the number of buttons to be displayed in the second area, identify the number of operations of each button to be displayed in the second area, and arrange the buttons to be displayed in the second area in the plurality of button areas based on the number of operations of each button. The image input may include a three-dimensional camera configured to obtain a three-dimensional image.

In accordance with another aspect of the present disclosure, a vehicle may include: a terminal configured to display buttons to be selected by a user, and receive a touch input as user input; an image input configured to receive an image of the user for receiving a gesture input as the user input; and a controller configured to divide an area of the terminal into a first area and a second area, determine a button selected by the user among buttons displayed in the first area based on the touch signal output by the touch input, and determine a button selected by the user among buttons displayed in the second area based on a finger image and an eye image in the image.

When determining the button selected by the user among the buttons displayed in the second area, the controller may be configured to generate a point of a fingertip based on the finger image, generate a point of a pupil based on the eye image, generate a straight line connecting the point of the fingertip with the point of the pupil, determine a position corresponding to a direction in which the generated straight line is directed, and determine the button disposed at the determined position. The controller may be configured to recognize an activity or motion range of an arm and a hand of the user based on the image and set a rich zone based on the recognized activity range, set an area corresponding to the set rich zone as the first area of the terminal, and set the remaining area of the terminal as the second area of the terminal.

The controller may be configured to operate the terminal to display an image of the determined button among the buttons displayed in the second area larger than an image of the remaining buttons displayed in the second area. Additionally, the controller may be configured to operate the terminal to display a color of an image of the determined button among the buttons displayed in the second area differently from a color of an image of the remaining buttons displayed in the second area. The vehicle may further include at least one physical button. The controller may be configured to identify the number of operations of the buttons displayed on the first area and the at least one physical button respectively, and operate the terminal to display a button having the identified number of operation greater than or equal to a reference number as a shortcut button in the second area.

Further, the controller may be configured to identify the number of buttons to be displayed in the second area, divide the second area into a plurality of button areas based on the identified number of buttons to be displayed in the second area, and operate the terminal to display the divided plurality of button areas. The controller may be configured to operate the display to divide the plurality of button areas into equal sizes. The image input may include a three-dimensional camera configured to obtain a three-dimensional image. The image input may be provided separately from the terminal.

The vehicle may further include a plurality of physical buttons. The controller may be configured to generate a point of a fingertip based on the image, generate a point of a pupil based on the image, generate a straight line connecting the point of the fingertip with the point of the pupil, determine a position corresponding to a direction in which the generated straight line is directed, and determine a physical button disposed at the determined position among the plurality of physical buttons. The vehicle may further include a plurality of light emitting elements disposed adjacent to each of the plurality of physical buttons. The controller may be configured to adjust lighting of a light emitting element disposed adjacent to the determined physical button.

The vehicle may further include a plurality of electronic devices configured to perform at least one function. The controller may be configured to identify an operation command of the determined button and execute operation of at least one electronic device of the plurality of electronic devices based on the identified operation command. The terminal may be disposed on a dashboard and may extend from a position adjacent to a driver's door to a position adjacent to a passenger's door.

In accordance with another aspect of the present disclosure, a method for controlling a vehicle may include: recognizing an activity or motion range of an arm and a hand of a user based on an image received by an image input; setting a rich zone based on the recognized activity range; setting an area corresponding to the set rich zone as a first area of a terminal; setting the remaining area of the terminal as a second area of the terminal; displaying a plurality of buttons selected by the user in the first and second areas, respectively; determining a button selected by the user among buttons displayed in the first area based on a touch signal received by a touch input, and operating at least one electronic device based on an operation command of the determined button in the first area; and determining a button selected by the user among buttons displayed in the second area based on a finger image and an eye image in the image received by the image input, and operating at least one electronic device based on an operation command of the determined button in the second area.

The determining of a button selected by the user among buttons displayed in the second area may include generating a point of a fingertip based on the image, generating a point of a pupil based on the image, generating a straight line connecting the point of the fingertip with the point of the pupil, determining a position corresponding to a direction in which the generated straight line is directed, and determining a button disposed at the determined position. The method may further include displaying an image of the determined button among the buttons displayed in the second area differently from images of the remaining buttons.

BRIEF DESCRIPTION OF THE DRAWINGS

These and/or other aspects of the disclosure will become apparent and more readily appreciated from the following description of exemplary embodiments, taken in conjunction with the accompanying drawings of which:

FIG. 5 is an exemplary view illustrating an example of setting a first area and a second area of the terminal according to an exemplary embodiment;

DETAILED DESCRIPTION

Figure 1:
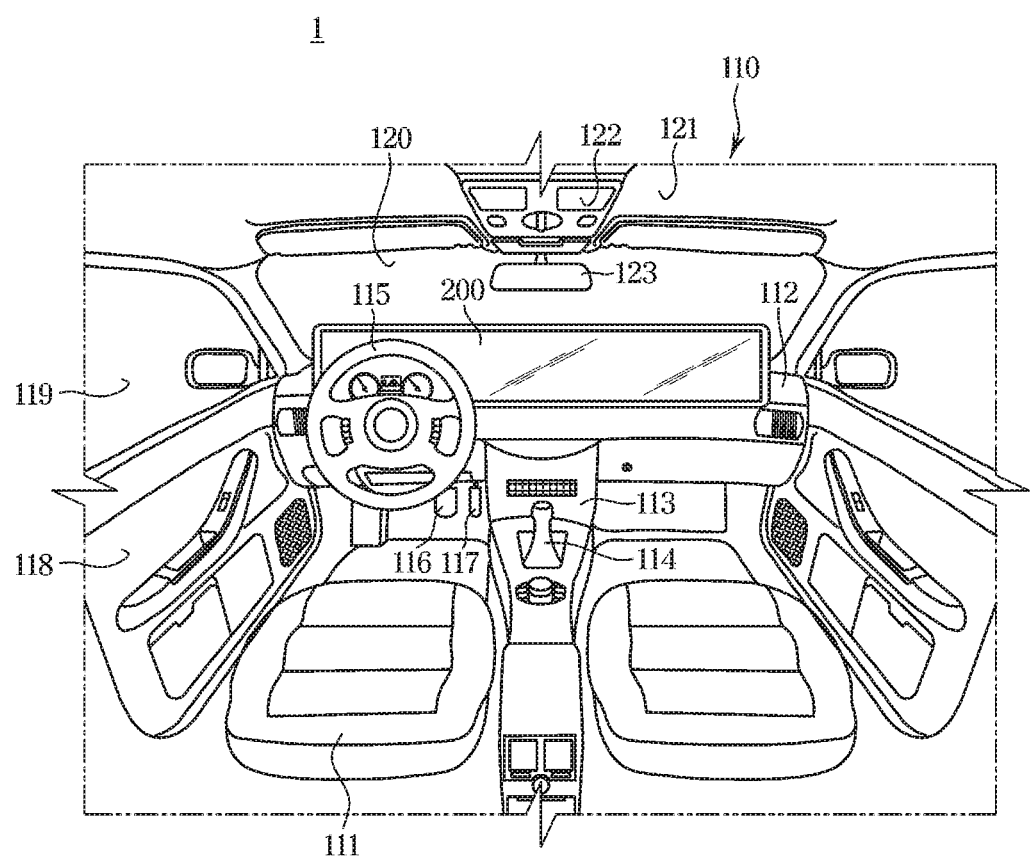
FIG. 1 is an internal view illustrating a vehicle when viewing from a back seat of the vehicle having a terminal according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following description, like reference numerals refer to like elements throughout the specification. Well-known functions or constructions are not described in detail since they would obscure the one or more exemplary embodiments with unnecessary detail. Terms such as "unit," "module," and "device" may be embodied as hardware or software. According to exemplary embodiments, a plurality of "units," "modules," and "devices" may be implemented as a single component or a single "unit," "module," and "device" may include a plurality of components.

It will be understood that when an element is referred to as being "connected" to another element, it can be directly or indirectly connected to the other element, wherein the indirect connection includes connection via a wireless communication network. It will be understood that, although the terms first, second, etc. may be used herein to describe various elements, these elements should not be limited by these terms. These terms are only used to distinguish one element from another. As used herein, the term "and/or" includes any and all combinations of one or more of the associated listed items. As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise. Reference will now be made in detail to exemplary embodiments of the present disclosure, examples of which are illustrated in the accompanying drawings.

Figure 2:
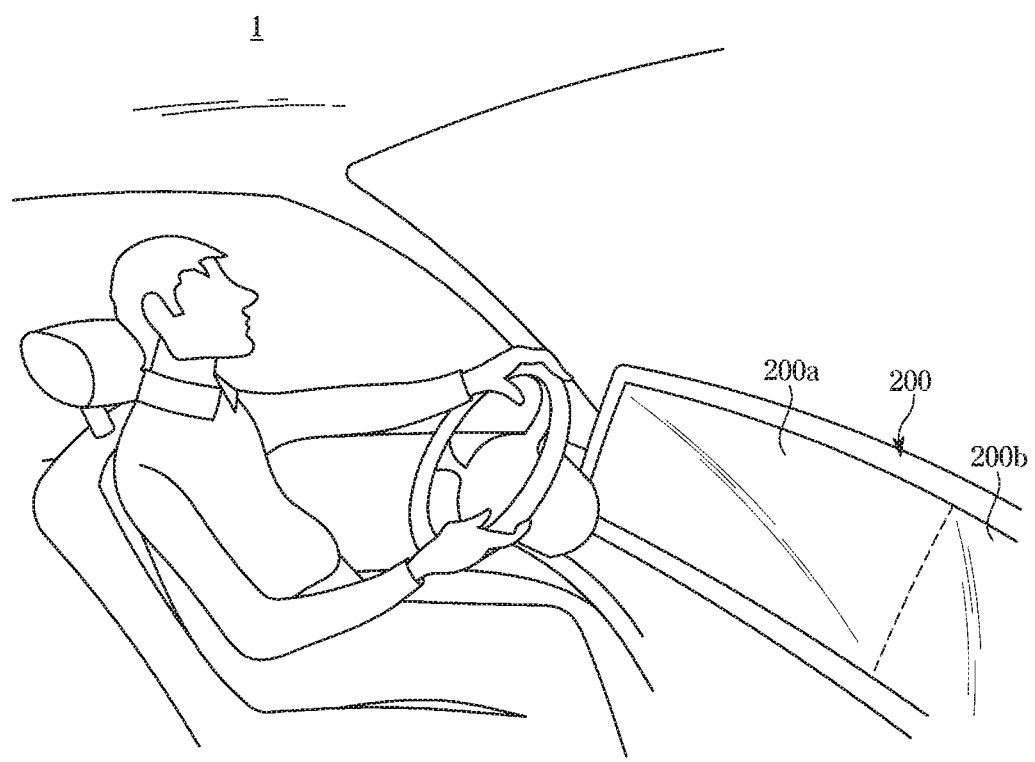
FIG. 2 is an internal view illustrating the vehicle when viewing from a passenger seat of the vehicle having the terminal according to an exemplary embodiment.

FIGS. 1 and 2 are views illustrating an example of a vehicle according to one exemplary embodiment. FIG. 1 is an internal view illustrating a vehicle when viewing from a back seat of the vehicle. FIG. 2 is the internal view illustrating the vehicle when viewing from a passenger seat of the vehicle.

A vehicle of the exemplary embodiment is an autonomous vehicle which automatically recognizes a road environment such as a change of an obstacle and a lane to generate a route for avoiding the obstacle in real time, and automatically travels to the destination by adjusting the driving of the vehicle according to the generated route. A vehicle 1 may include a body, and a chassis forming portions other than the body and in which mechanical devices required for operating the vehicle are installed.

As shown in FIG. 1, the body 110 includes seats 111 on which passengers may be seated, a dashboard 112, a center fascia 113 including a baffle plate and a blowhole of an air conditioner, a shift lever 114 disposed at the center fascia 113 and configured to receive an operation position. The body 110 may further include a parking button (EPB button) disposed around the shift lever and configured to receive an operation command of an electronic parking brake device (not shown).

The vehicle may be equipped with side brakes rather than parking buttons. The vehicle 1 may further include a steering wheel 121 of the steering device for adjusting a traveling direction, a brake pedal 116 that is engaged by the user in accordance with the braking intention of the user, and an accelerator pedal 117 that is engaged by the user in accordance with the acceleration intention of the user.

The vehicle 1 may further include front, rear, left, and right doors 118, a plurality of window glasses 119 installed in the front, rear, left, and right doors, a plurality of quarter window glasses installed between pillars, wherein the quarter window glasses do not open, a rear window glass installed in a back part of the body, and a front window glass 120 installed in a front part of the body. The vehicle 1 may further include a head lining 121 provided adjacent to the front window glass 120 and an overhead console 122 provided in the head lining 121, and provided with interior lights, on/off buttons for the interior lights and a door opening/closing button, and a room mirror 123 that provides a driver with rear fields of view of the vehicle 1.

The vehicle 1 may optionally include an electronic device for the convenience of the driver, such as an air conditioner, a lighting device, a heater (i.e., a heating wire) of the seat, a hands-free device, a position receiver (i.e., GPS), an audio device and a Bluetooth device, a front camera, a rear camera, a charging device of the user terminal, a high pass device.

The vehicle 1 may optionally include a sunroof opening/closing device for automatically opening and closing a sunroof, a door opening/closing device for automatically opening and closing the doors, a window glass opening and closing device for automatically opening and closing the window glass, and a door lock device for automatically locking and unlocking the doors. The vehicle 1 may further include a terminal 200 disposed on the dashboard 112 in front of the driver's seat, to display traveling information and operation information of various electronic apparatuses, and to receive operation commands of various electronic apparatuses.

The terminal 200 may be disposed on the dashboard 112 and may extend from a position that corresponds to a front of the passenger seat to a position corresponding to a front of the driver's seat. The terminal 200 may be extended from an installation position of the cluster to an upper position of a glove box in front of the passenger seat. The terminal 200 may be configured to display traveling information and operation state information of the vehicle displayed in the cluster. The terminal 200 may be configured to display a tachometer image, a speedometer image, a coolant thermometer image, a fuel gauge image, a direction switching instruction symbol, an upward lighting symbol, an emergency lighting symbol, a seat belt warning symbol, an odometer image, a tripmeter image, an automatic transmission selection lever symbol, a door open symbol, a fuel shortage symbol, and the like.

Additionally, the terminal 200 may be configured to display operation information of the audio device and the air conditioner displayed on a display of a head unit, and display an external temperature, an internal temperature, an external humidity, an internal humidity, a current time and the like. The terminal 200 may also be configured to display operation information of a heater (i.e., a heating wire) of the seats, a ventilation device of the seats, a heater of the steering wheel, and the like. The terminal 200 may be configured to display navigation information, communication information with a user terminal, and the like displayed in the Audio Video Navigation device (AVN).

Further, the terminal may be configured to display images in the forward, backward, leftward, and rightward directions of the vehicle in the autonomous mode. The terminal 200 may be configured to display a plurality of buttons selectable by the user. Each button may be a button to receive an operation command of at least one electronic device or an operation command of at least one function. Each button may be a button that receives a user input.

The terminal 200 may be configured to display response information that corresponds to the user input, operation information of the electronic device, or operation information of the function. The terminal 200 may include a touch panel, which is a touch input for receiving a touch signal received by the user, and a display panel, which is a display for displaying a variety of information. In other words, the terminal 200 may include a touch screen in which the touch panel and the display panel are integrated. The terminal 200 may be configured to identify at least one electronic device performing an operation command that corresponds to the user input, and transmit the operation command to the identified at least one electronic device. The operation command may be an operation command for one electronic device or an operation command for one of a plurality of functions performed by the one electronic device.

As shown in FIG. 2, the terminal 200 may include a first area 200a where a finger of a driver may touch and a second area 200b where the driver's finger is unable to touch or select. The first area 200a and the second area 200b of the terminal 200 may be set by the driver. In other words, the first area 200a and the second area 200b of the terminal 200 may be set by corresponding to an active area of the driver's arm and an active area of the hand. The first area 200a and the second area 200b of the terminal 200 may be set differently for each driver.

The terminal 200 may further include an image input into which an image of a driver for setting the first area 200a and the second area 200b and an image of a gesture of the driver are received. The image of the driver gesture may be a user input to select one of the plurality of buttons. The image input may be provided inside the vehicle to align the photographing surface with the driver's seat. The image input may be provided in a non-display area of the terminal.

The image input may be provided on a housing of the terminal or on a bezel of the terminal. The image input may be provided separately from the housing of the terminal. The image input may be disposed on the front window glass 120, on the room mirror 123, or on the overhead console 122. The control configuration of the vehicle 1 having such a terminal 200 will be described in more detail.

Figure 3:
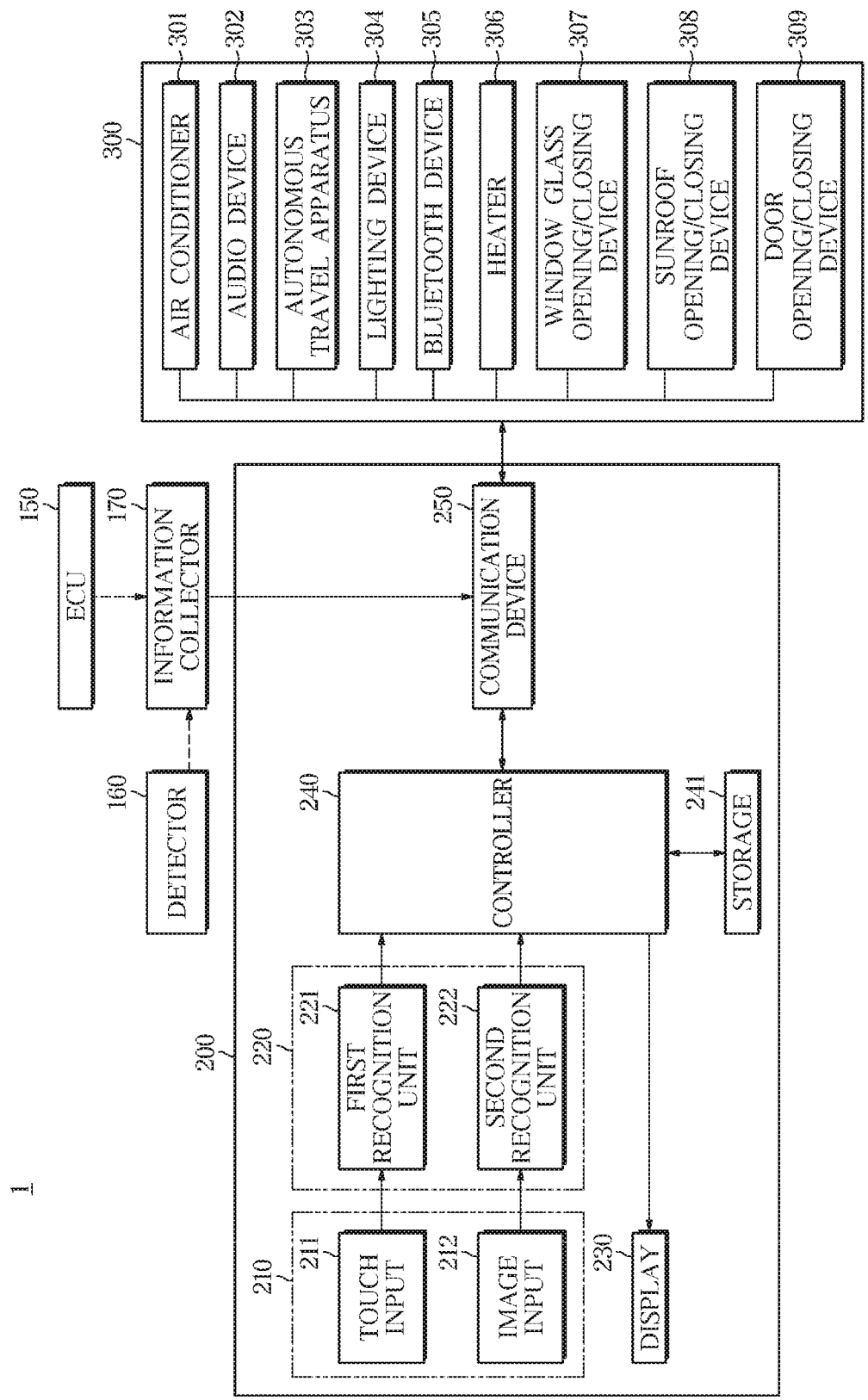
FIG. 3 is a block diagram illustrating the vehicle having the terminal according to an exemplary embodiment.

FIG. 3 is a block diagram illustrating the vehicle having the terminal 200 according to an exemplary embodiment. The vehicle may include at least one electronic control unit (ECU) 150, at least one detector 160, an information collector 170, the terminal 200 and a plurality of electronic devices 300. At least one electronic control unit (ECU) 150 may be provided in each of a power generating device, a power transmitting device, a traveling device, a steering device, a braking device, a suspension device, a transmission device, a fuel device, and various safety devices to control an operation of each device.

The detector 160 may be configured to detect information regarding a traveling condition and an environmental condition of the vehicle. The detector 160 may include at least one of a proximity sensor configured to detect rear or side obstacles or other vehicles, a rain sensor configured to detect amount of precipitation, a temperature sensor configured to detect indoor and outdoor temperature, a wheel speed sensor configured to detect speed of the front, rear, left and right wheels, an acceleration sensor configured to detect acceleration, a yaw rate sensor configured to detect a yaw rate, and a gyro sensor configured to detect a posture of the vehicle.

The information collector 170 may be configured to communicate with at least one electronic control unit (ECU) 150 to collect information regarding an operating state of each electronic control unit, communicate with a plurality of electronic devices 300 to collect operating information of each electronic device, and transmit the collected information and the collected operating information to the terminal 200. The information collector 170 may be configured to receive detection information from various sensors provided in the vehicle, identify traveling information and environment information of the vehicle corresponding to the received detection information, and transmit the identified traveling information and the environment information to the terminal 200.

For example, the traveling information of the vehicle may include a vehicle speed and the number of revolutions (RPM) of the axis of the vehicle, and may include current traveling distance information and total traveling distance information. The terminal 200 may include an input device 210, a recognition unit 220, a display 230, a controller 240, a storage 241, and a communication device 250. The input device 210 may be configured to receive the user input and transmit an input signal corresponding to the received user input to the recognition unit 220. For example, the input device 210 may be configured to receive operation modes such as a map display mode, a radio mode, an audio mode, a content playback mode, a broadcast mode, and a telephone call mode, and may be configured to receive an operation command of each mode. The operation command may include an instruction that corresponds to a setting value change of a channel, a volume, a temperature, and the like.

The input device 210 may include a touch input 211 configured to receive the user input by touch and an image input 212 configured to receive the user input by a gesture.

The touch input 211 may include a touch panel disposed adjacent a display panel of the display 230. The touch panel of the touch input 211 may be provided integrally with the display panel of the display 230. The touch panel may be configured to output a touch signal generated at the touched or selected position.

The touch panel may be classified into various types according to the driving method. The touch panel may include at least one of a resistive type in which a direct current (DC) voltage is applied to a metal electrode arranged on an upper plate or a lower plate and a touched position may be determined as a voltage gradient according to a resistance, a capacitive type in which an equal potential is formed on a conductive film and a touched portion may be determined by detecting a position where a voltage change of an upper plate and a lower plate due to a touch is detected, an electro-magnetic type in which the LC value induced by touching the conductive film may be detected by the electronic pen to sense the touched portion, a surface acoustic wave (SAW) type, and infrared type.

An area of the touch input 211 may be divided into a first touch area and a second touch area corresponding to the setting of the rich zone. The image input 212 may include a camera configured to obtain an image of a vehicle interior. The image input 212 may include a CCD or CMOS image sensor and may include a 3D spatial recognition sensor such as a KINECT (RGB-D sensor), a TOF (Structured Light Sensor), and a Stereo Camera. The image input 212 may include a plurality of cameras to obtain a two-dimensional image.

The recognition unit 220 may be configured to recognize a button that corresponds to the user input. The recognition unit 220 may be a memory implemented as a separate chip from the processor associated with the controller 240, and may be implemented as a single chip with the processor. The recognition unit 220 may include a first recognition unit 221 configured to recognize a touch signal input to the touch input 211 and a second recognition unit 222 configured to recognize a gesture in the image input to the image input 212.

The first recognition unit 221 may be configured to receive a touch signal touched by the user, recognize a position of a touch point based on the received touch signal, and transmit position information of the touch point corresponding to the recognized position of the touch point to the controller 240. The first recognizing unit 221 may be configured to recognize the position information of the touch point that corresponds to the time change and transmit the position information of the touch point that corresponds to the time change to the controller 240.

The second recognition unit 222 may be configured to recognize a person (i.e., a driver) in the image received to the image input 212, recognize a gesture motioned by the recognized person, identify the operation command that corresponds to the recognized gesture, and transmit the identified operation command to the controller 240. The second recognition unit 222 may be configured to recognize the person (i.e., the driver) in the image received to the image input 212, recognize the gesture motioned by the recognized person, and transmit gesture information that corresponds to the recognized gesture to the controller 240. When a plurality of cameras are mounted in the vehicle, the second recognition unit 222 may be configured to generate a three-dimensional image based on the two-dimensional image information obtained from the plurality of cameras and recognize the gesture of the driver based on the generated three-dimensional image.

The second recognition unit 222 may be configured to recognize the person (i.e., a driver) in the image received by the image input 212, recognize a face and a finger of the recognized person, recognize eyes and a pupil from the recognized face, generate a point of a fingertip and a point of the pupil, and transmit an image, with which the generated point of the fingertip and the point of the pupil are matched, to the controller 240. The second recognition unit 222 may be configured to generate a straight line connecting the point of the fingertip and the point of the pupil, and transmit an image, with which the generated straight line is matched, to the controller 240. The image with which the straight line is matched may include an image of the terminal.

The second recognition unit 222 may be configured to recognize the eyes of the driver and the fingertip of the driver in the image obtained by the image input 212, recognize a plurality of button areas of the second area of the terminal, and recognize edges of the plurality of button areas, and transmit an image, with which the recognized the point of the driver's pupil, the point of the fingertip, and points of the edges of the plurality of button areas are matched, to the controller 240. When the image of the driver is received in a rich zone setting mode, the second recognition unit 222 may be configured to recognize joint points of the shoulders, arms, and hands in the image of the driver, set the rich zone based on position information of the recognized joint points, and transmit the position information of the set rich zone to the controller 240. The rich zone is an active area in which the driver's arms and hands may move freely, and is a zone to set the area (i.e., the first area), in which the finger of the driver may touch, among the area of the terminal.

Figure 4A:
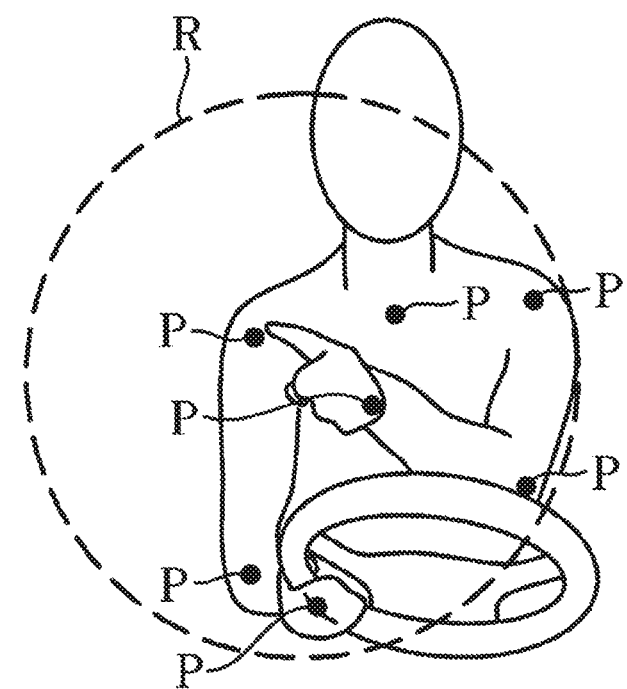
FIGS. 4A, 4B and 4C are exemplary views illustrating an example of setting a rich zone of the vehicle having the terminal according to an exemplary embodiment.
Figure 4B:
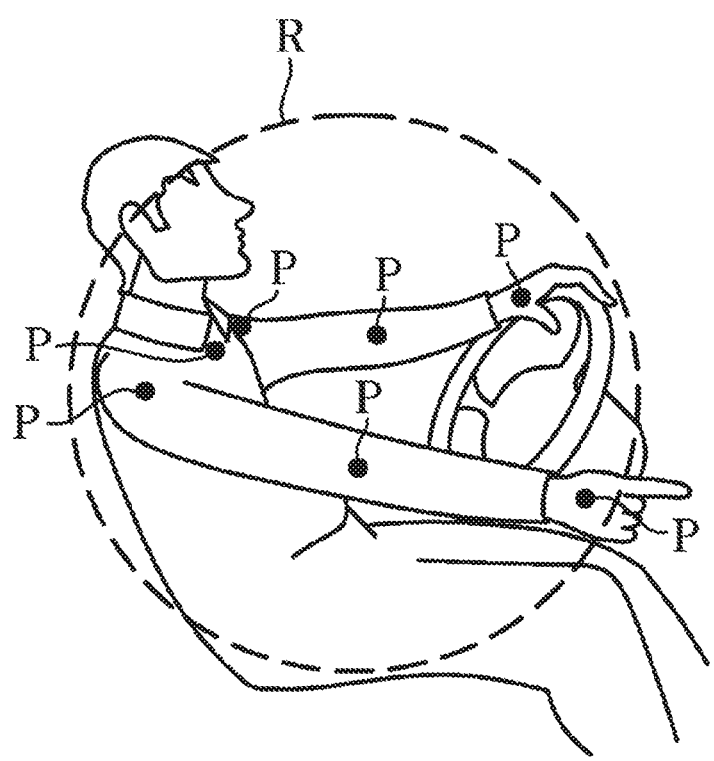

As shown in FIGS. 4A and 4B, the second recognition unit 222 may be configured to recognize the image of the driver in the three-dimensional image received by the image input, and recognize the joint point (p) of the shoulder, the arm and the hand in the image of the driver, recognize the joint point of the hand, and set the rich zone R based on the position information of the recognized joint point.

As shown in FIG. 4A, the second recognition unit 222 may be configured to set the rich zone for the active area of the left hand. As shown in FIG. 4B, the second recognition unit 222 may be configured to set the rich zone for the active region of the right hand. The second recognition unit 222 may be configured to set the rich zone for the active region of both the left hand and the right hand. Additionally, the second recognition unit 222 may be configured to set a concentric circle that corresponds to the straight line connecting the point of the fingertip to the shoulder of the driver as the rich zone. The second recognition unit 222 may be configured to transmit the position information of the set rich zone to the controller 240.

Figure 4C:
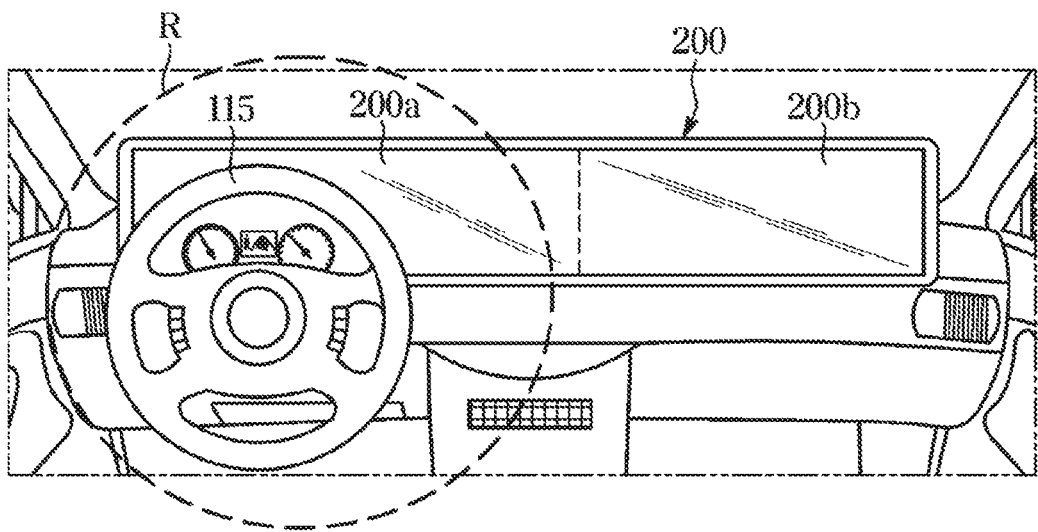

As shown in FIG. 4C, the second recognition unit 222 may be configured to recognize the position information of the rich zone R set with respect to the position of the steering wheel 115. When recognizing the position information of the rich zone R set with respect to the position of the steering wheel 115, the second recognition unit 222 may be configured to generate the position information of the rich zone by compensating for a preset error in the position of the recognized rich zone.

The second recognition unit 222 may be configured to recognize the position information of the rich zone based on the position of the driver's seat. When the image of the driver is received in the rich zone setting mode, the second recognition unit 222 may be configured to recognize the joint points of the shoulders, arms, and hands in the image of the driver, and transmit the image information matched with the joint points to the controller 240 to allow the controller 240 to set the rich zone.

The display 230 may be configured to display the traveling information, the state information, and the environment information of the vehicle, and display the operation information of various electronic devices provided in the vehicle. The display 230 may include a flat display panel such as a liquid crystal display (LCD), a plasma display panel (PDP), or an organic light emitting diode (OLED), but is not limited thereto. The display area of the display 230 may be divided into a first display area and a second display area corresponding to the setting of the rich zone.

The first display area of the display corresponds to the first touch area of the touch input, and the second display area of the display corresponds to the second touch area of the touch input. In other words, the touch panel and the display panel may be integrally provided, and thus the first display area and the first touch area may coincide with each other, and the second display area and the second touch area may coincide with each other.

In the exemplary embodiment, the first display area and the first touch area are referred to as the first area 200a of the terminal, and the second display area and the second touch area are referred to as the second area 200b of the terminal. The controller 240 may be configured to operate the display 230 to display information received by at least one of the information collector 170 and the plurality of electronic devices 300.

In other words, the controller 240 may be configured to operate the display 230 to display at least one of the traveling information of the vehicle, the state information of the vehicle, the environment information of the vehicle, and operate the display 230 to display the operation information regarding the function being performed in the vehicle on the display 230. The controller 240 may be configured to operate the at least one electronic device 300 or execute at least one function based on the user command received through the input device 210, and operate the display 230 to display an image corresponding to the executed operation. In other words, the controller 240 may be configured to adjust the image displayed on the display 230 based on the user command received by the input device 210.

The control configuration of the controller 240 will be described with reference to FIGS. 5 to 13. The controller 240 may be configured to activate the operations of the image input 212 and the second recognizing unit 222 when an operation command of the rich zone setting mode is received. The controller 240 may be configured to receive the position information of the rich zone recognized by the second recognition unit 222 and store the position information of the received rich zone in the storage 241, and set the first area 200a and the second area 200b of the terminal based on the position information of the received rich zone.

The controller 240 may be configured to receive the position information of the joint point recognized by the second recognition unit 222, set the rich zone based on the position information of the received joint point, obtain the position information of the set rich zone, and set the first area 200a and the second area 200b of the terminal based on the location information of the set rich zone. Additionally, the controller 240 may be configured to the area that corresponds to the position information of the rich zone of the terminal to the first area 200a and set the remaining area of the terminal except the first area to the second area 200b (See FIG. 4 C).

The first area 200a is an area of the terminal, which is located in a direction adjacent to the driver's seat, and is an area where the driver's finger may easily touch. The second area 200b is an area located in a direction adjacent to the passenger seat among the areas of the terminal, and is an area in which the finger of the driver is difficult to reach. When the first and second areas of the terminal are set, the controller 240 may be configured to identify the position information of the first area and the position information of the second area, maintain an arrangement of an image with respect to information to be displayed on the display 230 based on the identified position information of the first area and the position information of the second area, or change the arrangement of an image with respect to information to be displayed on the display 230.

When the rich zone is not set, the controller 240 may be configured to operate the display of the image based on predetermined position information of the first area and predetermined position information of the second area. The controller 240 may be configured to operate the display 230 to display traveling information requiring confirmation by the driver during traveling, and information regarding functions related to traveling of additional functions such as navigation information and autonomous driving information, on the first area 200a.

As shown in FIG. 5, the controller 240 may be configured to display the tachometer image (e.g., an image for RPM information (A1)) and the speedometer image (A2) in the first area 200a of the terminal and display the navigation image (A3). The controller 240 may be configured to display information displayed in the cluster in a part of the first area 200a of the terminal. The controller 240 may be configured to display the tachometer image, the speedometer image, a coolant thermometer image, a fuel gauge image, a direction switching instruction symbol, an upward lighting symbol, an emergency lighting symbol, a seat belt warning symbol, an odometer image, a tripmeter image, a door open symbol, and a fuel shortage symbol in the first area 200a of the terminal.

The odometer image corresponds to the current odometer information, and the tripmeter image corresponds to total odometer information. The controller 240 may be configured to display external environmental information such as external temperature and weather, and internal environment setting information such as heating line on/off information of the seat, ventilation on/off information, heating line on/off information of the steering wheel, in the first area 200a of the terminal.

The controller 240 causes the information displayed in the cluster to be displayed in the part of the first area 200a of the terminal, and causes the information displayed in the audio/video/navigation device (AVN) to be displayed in the remaining part of the first area 200a of the terminal. The controller 240 may allow an image of a function frequently executed by the driver to be displayed on the remaining area of the first area 200a. The controller 240 may be configured to display a mode change button or a button for changing a setting value of the function frequently executed by the driver.

The function frequently executed by the driver may be a function that is executed more than the reference number of times for a certain period of time. The controller 240 may be configured to display a destination input button, a route guidance cancel button, or the like in the first area 200a of the terminal. Additionally, the controller 240 may be configured to display a traveling speed setting button for autonomous traveling or the mode changing button. The controller 240 may be configured to operate the display 230 to display images of the buttons provided on the head unit in the second area 200b of the terminal. The controller 240 may also be configured to operate the display 230 to display a plurality of buttons for receiving operation commands of various electronic devices performing additional functions such as convenience functions in the second area 200b.

The additional function of the vehicle may include at least one of a navigation function, a map display function, an autonomous traveling function, a music play function, a radio function, air conditioning function information, a telephone call function, a broadcast function (DMB function), a content play function, and an Internet search function. The controller 240 may be configured to operate the display to display the mode change button for changing the image displayed in the first area in the second area. The controller 240 may be configured to divide the second area of the terminal into a plurality of button areas based on the number of buttons to be displayed in the second area. The number of button areas may be a preset number. The number of divisions of the second area of the terminal may be equal to the number of buttons. The controller 240 may be configured to display buttons having operation commands selectable by the user in the second area.

Figure 6:
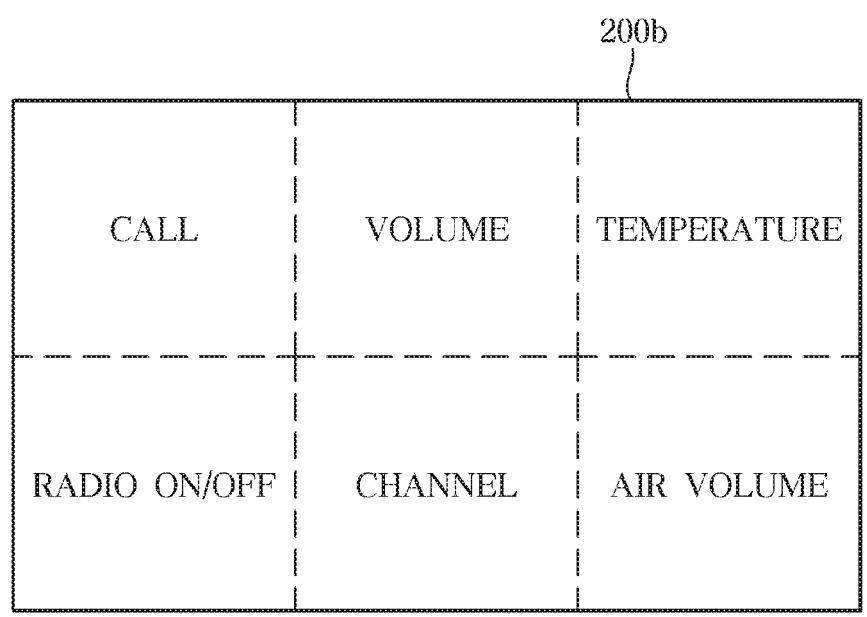
FIGS. 6, 7, 8, and 9 are exemplary views illustrating an example of displaying buttons in the second area of the terminal according to an exemplary embodiment.

As shown in FIG. 6, the controller 240 may be configured to divide the second area 200b of the terminal into a plurality of button areas, and operate the display to display images of the preset buttons in the button areas. For example, the image of the preset buttons may include an image of a call button, an image of a volume button, an image of a temperature button, an image of a radio on/off button, an image of a channel button, and an image of an air volume button. The preset buttons may be a button operated by many drivers. In addition, the number of the plurality of button areas may be six. The size of the button area occupied by one button in the second area of the terminal is maximized, thereby improving the recognition accuracy of the user input.

The controller 240 may be configured to identify the buttons frequently used by the driver and divide the second area into the plurality of button areas based on the number of buttons. The buttons frequently used by the driver may be a button that has been operated more than the reference number of times for the certain period of time. The controller 240 may be configured to identify the button operated more than the reference number for the certain period of time, divide the second area into the plurality of button areas based on the number of buttons, and operate the display to display the images of the buttons in each of the divided button areas.

Displaying the buttons may include displaying a text image that corresponds to the operation command, the function and the setting value. Displaying the buttons may include displaying a symbol image that corresponds to the operation command, the function and the setting value. The controller 240 may be configured to identify the number of operations of the driver for each button, select a predetermined number of buttons in descending order of the number of operations, and operate the display to display the selected buttons in each of the divided button areas. The predetermined number of buttons may be equal to the number of the plurality of button areas. The controller 240 may be configured to arrange the buttons most frequently operated by the driver in the button areas closest to the driver's seat in the second area.

Figure 7:
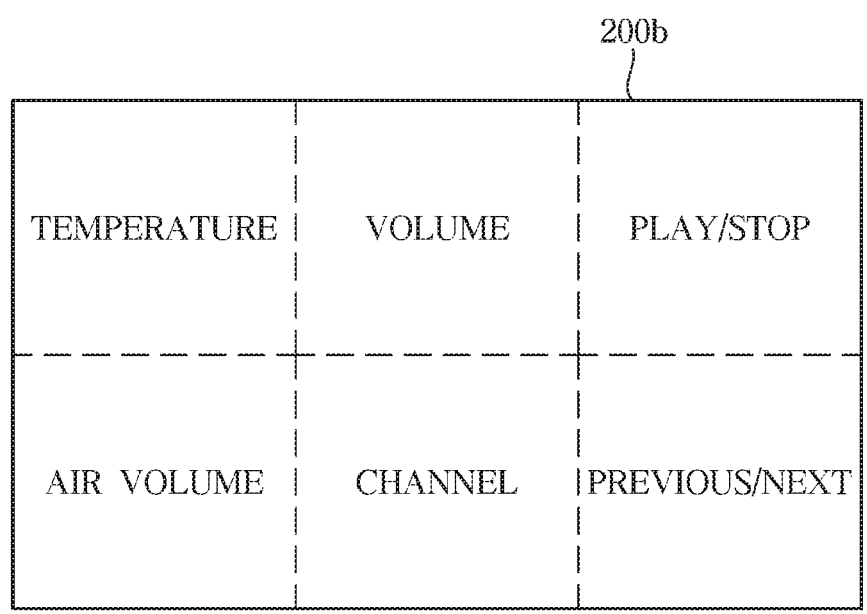

As shown in FIG. 7, the controller 240 may be configured to identify the buttons frequently operated by the driver and operate the display to display the images of the identified buttons are displayed in the second area of the terminal. For example, the buttons frequently operated by the driver may include the image of temperature button, the image of volume button, the image of play/stop button, the image of air volume button, the image of channel button, and the image of previous/next button.

When the most frequently operated buttons among the buttons operated by the driver is the temperature button and the air volume button, and the least operated button is the play/stop button and the previous/next button, the display 230 may be configured to display the image of temperature button and the image of air volume button in the button areas closest to the driver's seat, and display the image of playback/stop button and the image of previous/next song button in the button areas furthest from the driver's seat. The controller 240 may be configured to identify the number of operations of the buttons displayed in the second area 200b and change the arrangement of the buttons based on the detected number of operations. The controller 240 may be configured to divide the second area into a larger number or a smaller number than the predetermined number based on the number of buttons to be displayed.

Figure 8:
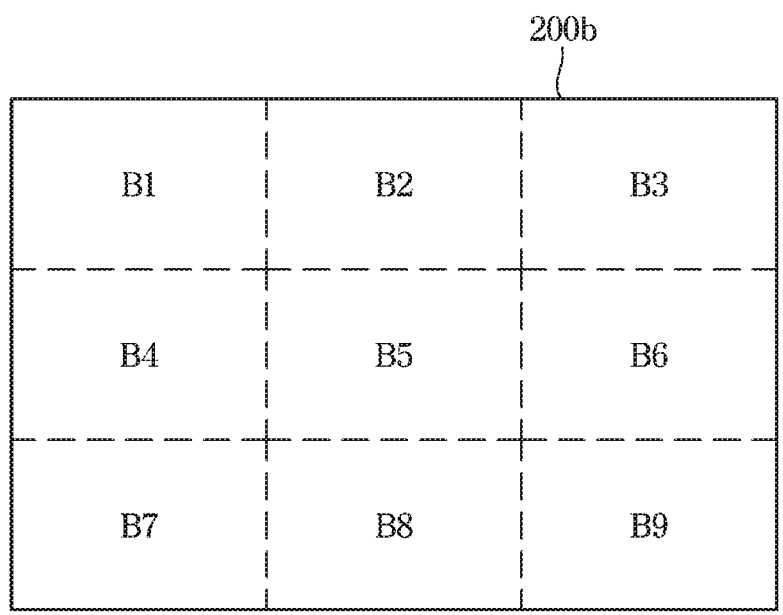
Figure 9:
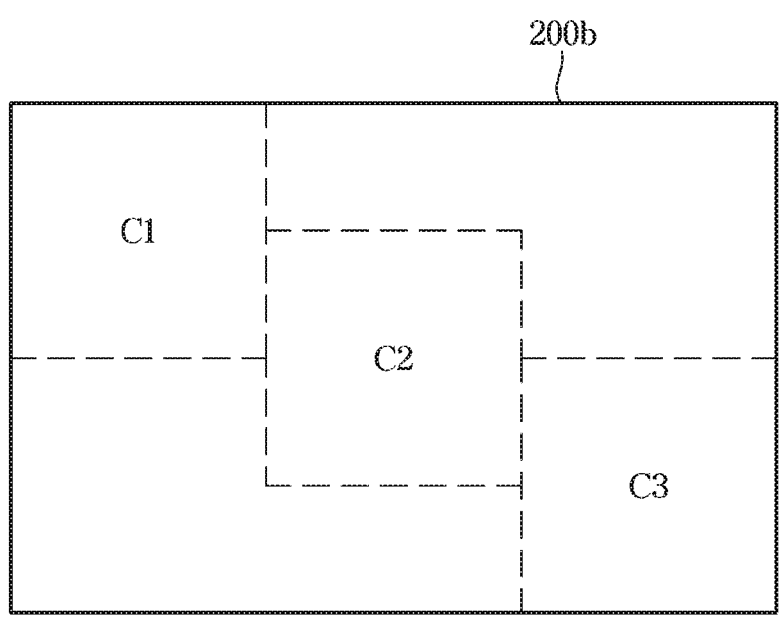

As shown in FIG. 8, when the predetermined number is six, the controller 240 may be configured to divide the second area into nine button areas B1 to B9. As shown in FIG. 9, when the predetermined number is six, the controller 240 may be configured to divide the second area into three button areas C1, C2, and C3. Without arranging the three button areas C1, C2, and C3 in a row in the vertical or horizontal direction, the controller 240 may be configured to arrange the three button areas C1, C2, and C3 in the vertical direction (y-axis) as low as a predetermined length, thereby improving the recognition accuracy of the user input. This may improve the recognition accuracy of the user input.

The controller 240 may be configured to divide the area of the terminal into the first area and the second area, and operate the display to display at least one button in the first area. The controller 240 may allow the second area to be displayed as a blank area. In other words, the controller may be configured to operate the display so that the button is not displayed in the second area (e.g., the area may remain blank or show other features). The controller 240 may be configured to identify the number of operations of the at least one button displayed in the first area and the number of operations of at least one physical button provided in the vehicle, identify the buttons having the number of operations equal to or greater than the reference number, and operate the display to display the identified buttons as a shortcut button in the second area.

At this time, the controller 240 may be configured to identify the number of buttons to be displayed in the second area, divide the second area by the number corresponding to the identified number, thereby generating the plurality of button areas in the second area, operate the display to arrange and display the buttons having the number of operations equal to or greater than the reference number on the generated plurality of button areas. The sizes of the plurality of button areas may be the same.

The controller 240 may be configured to operate the display so that the buttons to be displayed in the second area are changed or maintained, by identifying the number of operations of the at least one button displayed in the first area and the number of operations of the at least one physical button provided in the vehicle at a predetermined period. When the number of operations of one of the at least one button displayed in the first area is identified and the at least one physical button provided in the vehicle is selected, the controller 240 may be configured to count the number of operations of the selected button, and compare the counted number of operations and the reference number.

The controller 240 may be configured to operate the display to display the shortcut button as a default in the second area. The shortcut button is a button for executing a specific command, and may be a button having a predetermined operation command. The controller 240 may be configured to operate the display to display only the preset buttons in the first area first and operate the display to display the remaining buttons in the second area in response to the user input. At this time, the controller 240 may be configured to operate the display to delete the images of the preset buttons to be displayed first, and display the images of the remaining buttons to be displayed secondly.

When position information of a touch point is received by the first recognition unit, the controller 240 may be configured to identify a button having the position information of the received touch point, identify an operation command of the identified button, change a setting value of at least one function based on the identified operation command, and operate the display to display an image corresponding to the changed setting value of the at least one function. The controller 240 may be configured to adjust a state of at least one function based on the identified operation command, and operate the display to display an image corresponding to the controlled state of the at least one function. The controller 240 may be configured to execute an operation of the electronic device based on the identified operation command, and operate the display to display an image corresponding to the operation of the electronic device is displayed.

When the touch signal is received from the first recognition unit, the controller 240 may be configured to identify position information of a touch point based on the received touch signal, identify a button having the position information of the touch point, and identify an operation command of the identified button. The controller 240 may be configured to change a setting value of at least one function, or adjust a state of at least one function, or execute an operation of the electronic device based on the identified operation command.

The controller 240 may be configured to transmit the identified operation command to the electronic device to perform the at least one function to change the setting value of at least one function or the state of at least one function is adjusted based on the identified operation command. The controller 240 may be configured to identify the electronic device to perform the identified operation command, and transmit the identified operation command to the identified electronic device.

When recognizing the touch point that corresponds to the touch input of the user, the controller 240 may be configured to recognize a first touch point corresponding to the touch input, recognize a button corresponding to the first touch point, and obtain an operation command intended by the user based on a change in the position of the first touch point in accordance with a change of time.

At this time, the controller 240 may be configured to recognize a sliding direction based on the change of the position of the touch point according to the change of the time, and obtain the operation command based on the recognized sliding direction. The controller 240 may be configured to activate only the first touch area of the touch panel corresponding to the first area of the terminal and deactivate the second touch area of the touch panel corresponding to the second area of the terminal.

In addition, the touch input 211 may be configured to generate a touch signal only when the first area of the terminal is touched, and may not generate the touch signal although the second area of the terminal is touched. The controller 240 may be configured to activate all of the first and second touch areas of the touch panel corresponding to the first and second areas of the terminal to recognize the touch points in the first and second touch areas, and recognize a virtual touch point in the second area corresponding to the gesture input of the user.

When recognizing the virtual touch point corresponding to the gesture input, the controller 240 may be configured to recognize an initial virtual touch point corresponding to the gesture input, identify a button corresponding to the first virtual touch point, and obtain an operation command intended by the user based on a change of a position of the first virtual touch point. At this time, the controller 240 may be configured to recognize a sliding direction based on the change of the position of the virtual touch point according to the change of the time, and obtain an operation command based on the recognized sliding direction.

When the button corresponding to the first virtual touch point is a volume button, the controller 240 may be configured to lower the volume by one level corresponding to the movement from the upper side to the lower side, and increase the volume by one level corresponding to the movement from the lower side to the upper side. When recognizing the first virtual touch point, the controller 240 may be configured to receive the image in which the point of the pupil point and the point of the fingertip are matched, generate a straight line connecting the point of the pupil and the point of the fingertip in the received image, extend the generated straight line toward the terminal, and recognize a point where the extended straight line reaches as a virtual touch point.

When a straight line-matched image is received, the controller 240 may be configured to extend the straight line in the received image toward the direction of the second area of the terminal and recognize a point where the extended straight line reaches, as the first virtual touch point. The controller 240 may be configured to recognize the position of the second region of the terminal with three-dimensional coordinate information previously stored with respect to a fixed object in the image. For example, the fixed object may be a steering wheel or the driver's seat.

Figure 10:
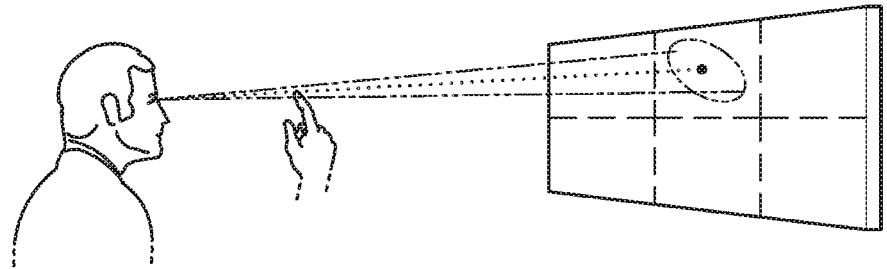
FIG. 10 is an exemplary view illustrating an example of recognizing a virtual touch point of the terminal according to an exemplary embodiment.

As shown in FIG. 10, the controller 240 may be configured to generate a straight line connecting one of the two pupil points in the image to the point of the fingertip, extend the generated straight line, obtain a position to which the extended straight line is directed, and recognize a button displayed at the obtained position. Accordingly, the controller may be configured to recognize the virtual touch point intended by the user.

The position information on the plurality of button areas of the second area of the terminal may be stored in advance based on the fixed object in the vehicle. Accordingly, the controller 240 may be configured to recognize the virtual touch point based on the position information of the plurality of button areas of the terminal based on the fixed object in the image and the position information of the direction of the straight line extending in the image.

When the second area of the terminal exists in the image, the controller 240 may be configured to generate the straight line connecting the point of the fingertip and one of the two pupil points in the image, extend the generated straight line, recognize the button area, to which the extended straight line is directed, among the plurality of button areas of the second area of the terminal, identify the button area, to which the extended straight line is directed, and identify the button displayed in the identified button area. The controller 240 may be configured to correct the virtual touch point by reflecting the preset error in the position information of the virtual touch point (see circle in FIG. 10). The controller 240 may be configured to operate the display to display the button disposed at the virtual touch point, differently from the other buttons.

Figure 11:
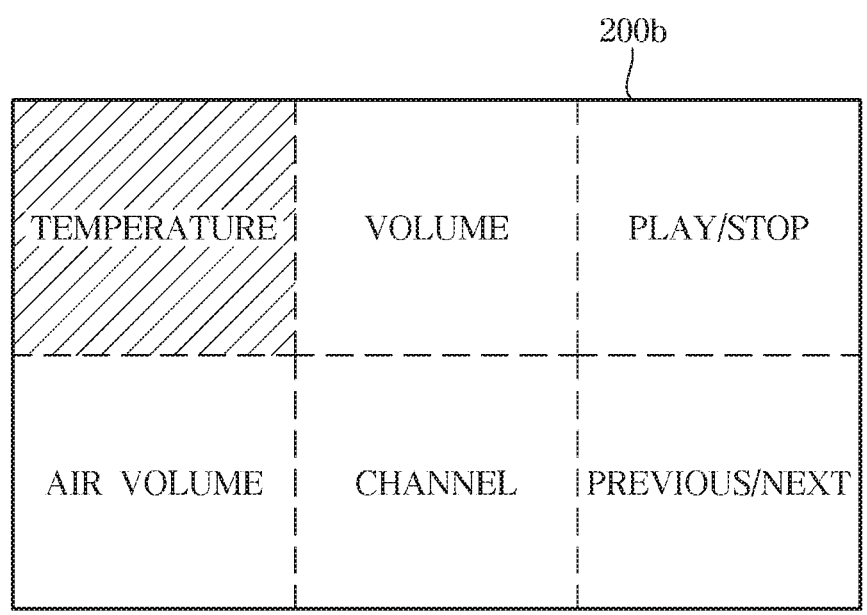
FIGS. 11 and 12 are exemplary views illustrating an example of displaying buttons corresponding to user input in the terminal according to an exemplary embodiment.

As shown in FIG. 11, the controller 240 may be configured to operate the display to highlight the image of the button (e.g., a temperature button) disposed at the virtual touch point. The controller 240 may also be configured to operate the display to display a color of the image of the button (e.g., temperature button) disposed at the virtual touch point, differently from the colors of the remaining buttons.

Figure 12:
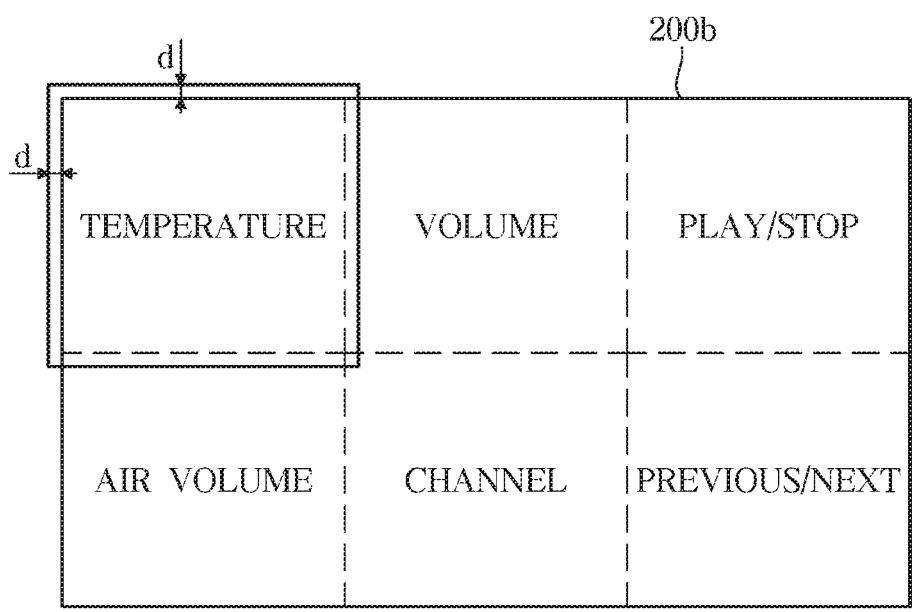

As shown in FIG. 12, the controller 240 may be configured to operate the display so that a size of the image of the button disposed at the virtual touch point is enlarged by the predetermined length d and displayed larger than the other buttons.

Figure 13:
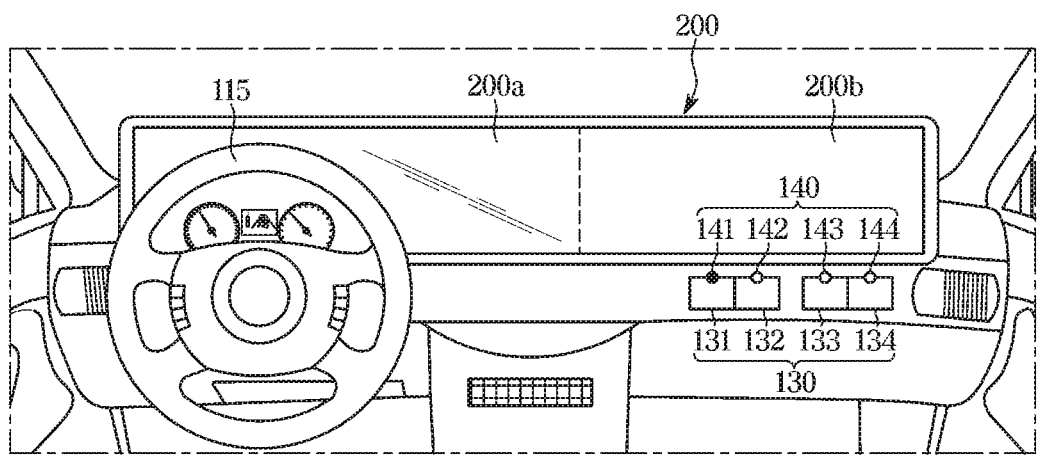
FIG. 13 is an exemplary view illustrating physical buttons disposed on the vehicle having the terminal according to an exemplary embodiment.

As shown in FIG. 13, the vehicle may further include the plurality of physical buttons 130: 131-134 provided at positions where the driver's fingers are difficult to reach, for example, at the position of the front passenger seat. The vehicle may further include a plurality of light emitting devices 140:141-144 provided adjacent to the plurality of physical buttons.

The plurality of physical buttons 130:131-134) may be operated by a force applied by the driver, and may be operated by the gesture input of the driver. The plurality of light emitting devices 140: 141-144 may be turned on when the associated physical button is operated. The controller 240 may be configured to identify the operation command of the physical button disposed in the vehicle using the gesture input of the user. In other words, the controller 240 may be configured to generate the straight line connecting one of the two pupil points in the image to the point of the fingertip, extend the generated straight line, obtain the position to which the extended straight line is directed, and identify the physical button provided at the obtained position. Accordingly, the controller may be configured to identify the physical button for user input.

In particular, the vehicle may be configured to store the position information of the physical buttons provided therein. At this time, the position information of the physical button may be stored in advance based on the fixed object in the vehicle. By adjusting the lighting of the light emitting elements disposed adjacent to the physical button identified, the controller 240 may allow a user to recognize that the operation of the physical button the gesture input.

The storage 241 may be configured to store position information of the first area and position information of the second area. The storage 241 may also be configured to store the position information of the first area and the position information of the second area for each user. The storage 241 may be configured to store position information of each button image displayed in the second area. The storage 241 may additionally be configured to store position information of a plurality of button areas of the second area. The position information of the plurality of button areas may include coordinate information on the upper, lower, right, and left sides of the terminal. The position information of the plurality of button areas may further include coordinate information on a three-dimensional space based on a fixed object around the driver, such as the driver's seat or the steering wheel.

Further, the storage 241 may be configured to store coordinate information of the image corresponding to the position information of each button area. The storage 241 may be configured to store the identification information of the buttons disposed in the plurality of button areas of the second area. The storage 241 may also be configured to store an operation command that corresponds to the vertical slide direction or the horizontal (that is, left and right) slide directions for each button. The storage 241 may be configured to store position information of a button displayed in the second area for each user store position information of the physical buttons provided in the vehicle.

The storage 241 may include a volatile memory. The volatile memory may include at least one of S-RAM and D-RAM. The storage 241 may include a non-volatile memory. The non-volatile memory may include at least one of a flash memory, a read only memory (ROM), an erasable programmable read only memory (EPROM), and an electrically erasable programmable read only memory (EEPROM). The storage 241 may be provided integrally with the controller 240. Each of the memories may be a memory that is implemented as a chip separated from the above mentioned processor related to the controller 240, or may be implemented on a single chip with a processor.

The storage 241 may be implemented using at least one of a non-volatile memory element, e.g., a cache, Read Only Memory (ROM), Programmable ROM (PROM), Erasable Programmable ROM (EPROM), Electrically Erasable Programmable ROM (EEPROM) and flash memory; a volatile memory element, e.g., Random Access Memory (RAM); or a storage medium, e.g., Hard Disk Drive (HDD) and CD-ROM. The implementation of the memory is not limited thereto.

The communication device 250 performs communication with the plurality of electronic devices and the information collector. The communication unit 250 may directly communicate with various electronic control devices in the vehicle 1, may communicate with the user terminal, and may communicate with an external device. The external device may include at least one of a smart key (not shown), a server (not shown), and a storage device (not shown). The communication device 250 may include one or more components configured to allow communication with an internal device and an external device, wherein the communication device may include at least one of a short-range communication module, a wired communication module, and a wireless communication module.

The short-range communication module may include a variety of short-range communication modules, which are configured to transmit and receive a signal using a wireless communication module in the short range, e.g., Bluetooth module, Infrared communication module, Radio Frequency Identification (RFID) communication module, Wireless Local Access Network (WLAN) communication module, NFC communication module, and ZigBee communication module.

The wired communication module may include a variety of wired communication modules, e.g., Controller Area Network (CAN) communication module, Local Area Network (LAN) module, Wide Area Network (WAN) module, and Value Added Network (VAN) module or a variety of cable communication modules, e.g., Universal Serial Bus (USB), High Definition Multimedia Interface (HDMI), Digital Visual Interface (DVI), recommended standard 232 (RS-232), and plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wi-Fi module, Wireless broadband module, Global System for Mobile (GSM) Communication, Code Division Multiple Access (CDMA), Wideband Code Division Multiple Access (WCDMA), Time Division Multiple Access (TDMA), and Long Term Evolution (LTE).

The communication device 250 may further include a position receiver. The position receiver includes a Global Positioning System (GPS) receiver and a signal processor to process GPS signals obtained by the Global Positioning System (GPS) receiver. The GPS receiver includes an antenna module to receive position signals of a plurality of GPS satellites. The antenna module may be provided on an antenna 119 disposed on the exterior of the vehicle. The signal processor includes a software to obtain a current position using distance and time information corresponding to the position signals of the plurality of GPS satellites, and an output device to output the obtained position information of the vehicle.

The position receiver may be configured to transmit position information regarding the current position to the controller 240. A plurality of electronic devices 300 may be provided. The plurality of electronic devices may include at least two of an air conditioner 301 configured to adjust the temperature inside the vehicle; an audio device 302 for playing music files or radio; an autonomous travel apparatus 303 configured to autonomously operate the vehicle within a lane to a destination while avoiding an obstacle; an lighting device 304 configured to adjust the brightness inside the vehicle; a Bluetooth device 305 for communication with the user terminal; a heater 306 configured to provide heat to the seats; a window glass opening/closing device 307 for automatically opening and closing the window glass; a sunroof opening/closing device 308 for automatically opening and closing the sunroof; a door opening/closing device 309 for automatically opening and closing front, rear, left and right doors; and a door locking device (not shown) for locking or unlocking front, rear, left and right doors. The operation command may include a power on/off command of each electronic device, and an adjustment command of the function of each electronic device.

Figure 14:
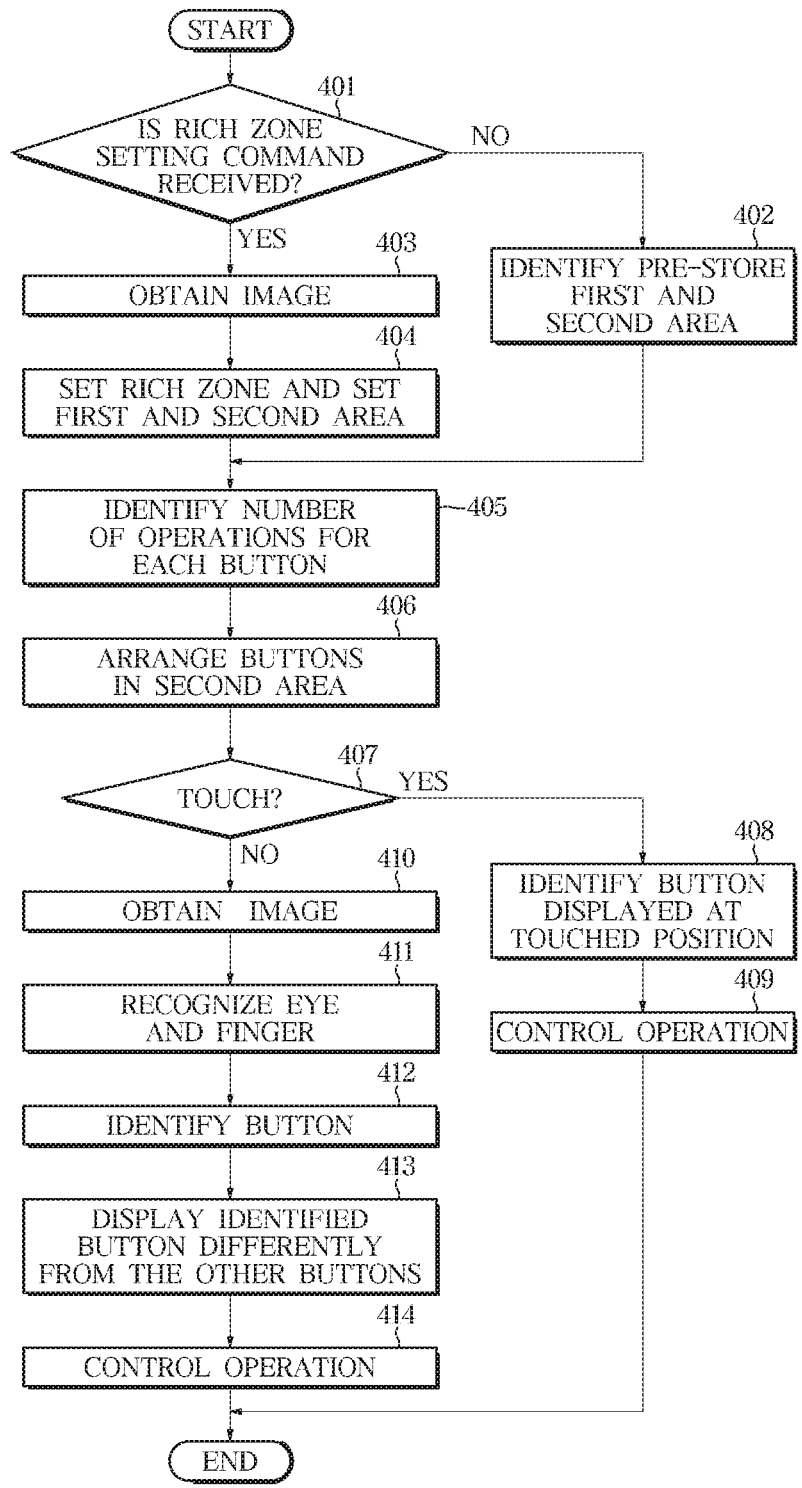
FIG. 14 is a flowchart illustrating a control method of the vehicle having the terminal according to an exemplary embodiment.

FIG. 14 is a flowchart illustrating a control method of the vehicle according to an exemplary embodiment. The vehicle may be configured to determine whether a rich zone setting command has been received (401). In response to determining that the rich zone setting command has not been received, the vehicle may be configured to identify a first area and a second area that are pre-stored (402). The vehicle may be configured to distribute and display the images corresponding to the traveling information, the state information, the environment information, and the additional function information, in the first area and the second area of the terminal based on the position information of the pre-stored first area and second area.

In response to determining that the rich zone setting command has been received, the vehicle may be configured to perform the rich zone setting mode. When performing the rich zone setting mode, the vehicle may be configured to activate the operation of the image input 212 and output guidance information for setting the rich zone via the terminal 200. For example, outputting the guidance information for setting the rich zone may include displaying a sign requesting the circle to be drawn using the arm and the hand while sitting on the driver's seat. The outputting of the guidance information for setting the rich zone may include displaying a video that draws the circle using the arm and the hand while sitting on the driver's seat.

The outputting of the guidance information for setting the rich zone may further include outputting a guidance voice requesting the circle to be drawn using the arm and the hand while sitting on the driver's seat. The vehicle may be configured to output the guidance information and obtain a predetermined range image based on the driver's seat using the image input for a predetermined time (403). At this time, an image around the driver and an image of the driver may be obtained.

Obtaining the predetermined range image based on the driver's seat may include obtaining a three-dimensional image. When the image is obtained, the vehicle may be configured to recognize the joint points of the driver's shoulders, arms, and hands in the obtained image, and set the rich zone based on the position information of the recognized joint point. The rich zone is an active area in which the driver's arms and hands may move freely. The rich zone is a zone for setting an area (i.e., the first area) in which the finger of the driver may touch among the areas of the terminal.

The vehicle may be configured to set the rich zone for the active area of the driver's left hand, set the rich zone for the active area of the driver's right hand, and set the rich zone for the active area of both the left and right hands. The vehicle may be configured to set a concentric circle of the straight line connecting the point of the fingertip to the shoulder of the driver in the image to the rich zone. The vehicle may be configured to recognize the position information of the rich zone with respect to the active area of both the left and right hands based on the position of the steering wheel 115, set the area of the terminal to the first area and the second area based on the recognized the position information of the rich zone (404), and store the set position information of the first area and the position information of the second area.

The vehicle may be configured to distribute and display the images corresponding to the traveling information, the state information, the environment information, and the additional function information, to the first area and the second area of the terminal based on the set position information of the first area and the position information of the second area. For example, the vehicle may be configured to display a tachometer image (e.g., image for RPM information) and the speedometer image in the first area of the terminal, and display the navigation image.

The vehicle may be configured to display the tachometer image, the speedometer image, the coolant thermometer image, the fuel gauge image, the direction switching instruction symbol, the upward lighting symbol, the emergency lighting symbol, the seat belt warning symbol, the odometer image, the tripmeter image, the door open symbol, and the fuel shortage symbol in the first area 200*a* of the terminal. The vehicle may further be configured to display the external environmental information such as the external temperature and the weather, and the internal environment setting information such as the heating line on/off information of the seat, the ventilation on/off information, the heating line on/off information of the steering wheel in the first area 200*a* of the terminal.

Additionally, the vehicle may be configured to display the destination input button, the route guidance cancel button, or the like in the first area 200*a* of the terminal. The vehicle may be configured to display the traveling speed setting button for autonomous traveling or the mode changing button. The vehicle may display the plurality of buttons for receiving the operation commands of various electronic devices performing additional functions such as convenience functions in the second area 200b. The additional function of the vehicle may include at least one of the navigation function, the map display function, the autonomous traveling function, the music play function, the radio function, the air conditioning function information, the telephone call function, the broadcast function (DMB function), the content play function, and the Internet search function.

To display the plurality of buttons on the second area of the terminal, the vehicle may be configured to divide the second area of the terminal into the plurality of button areas, and display each button in the plurality of button regions. The image of the button displayed in the plurality of button areas may be the image of the preset button. For example, the vehicle may be configured to display the image of the call button, the image of the volume button, the image of the temperature button, the image of the radio on/off button, the image of the channel button, and the image of the air volume button in each button area of the second area of the terminal.

The vehicle may be configured to display only the buttons frequently used by the driver in the second area of the terminal. At this time, the vehicle may be configured to divide the second area of the terminal according to the number of buttons to be displayed, or may divide the second area into the predetermined number. The number of buttons to be displayed may be the number of buttons frequently used by the user.

More specifically, the vehicle may be configured to identify the number of operations for each button (405). Accordingly, the vehicle may be configured to identify the buttons frequently used by the driver. The vehicle may be configured to identify the number of buttons frequently used by the driver, divide the second area into the plurality of button areas based on the number of buttons, and arrange buttons in the plurality of button areas, respectively (406). The vehicle may be configured to display the image of the buttons in the second area of the terminal.

The vehicle may be configured to identify the number of operations of the driver for each button frequently used by the driver, select the predetermined number of buttons in descending order of the number of operations, and display the selected buttons in the plurality of button areas. The vehicle may be configured to display the button most frequently operated by the driver in the button area closest to the driver's seat. For example, the buttons frequently operated by the driver may include the image of temperature button, the image of volume buttons, the image of play/stop button, the image of air volume buttons, the image of channel button, and the image of previous/next song button.

When the most frequently operated buttons among the buttons operated by the driver is the temperature button and the air volume button, and the least operated button is the play/stop button and the previous/next button, the vehicle be configured to display the image of temperature button and the image of air volume button in the button areas closest to the driver's seat, and display the image of playback/stop button and the image of previous/next song button in the button areas furthest from the driver's seat. The vehicle may be configured to determine whether the terminal is touched (407). In response to determining that the terminal is touched, the vehicle may be configured to identify the button displayed at the touched position (408).

More specifically, when the vehicle receives the touch signal for the touch input as the user input, the vehicle may be configured to recognize the position of the touch point based on the received touch signal, identify the position information of the touch point corresponding to the recognized position of the touch point, and identify the button having the position information of the identified touch point. The identified touch point may be one point within the first area of the terminal. The button having position information of the identified touch point may be a button that may be touched by the user, and may be a button displayed in the first area of the terminal.

The identified touch point may be one point in the second area of the terminal. The button having the position information of the identified touch point may be a button displayed in the second area of the terminal. Accordingly, the vehicle may be configured to recognize the button touched by the passenger sitting on the passenger seat. The vehicle may be configured to identify the operation command of the identified button, and execute the operation corresponding to the identified operation command (409). The executing of the operation corresponding to the identified operation command may include changing the setting value of at least one function based on the identified operation command, and displaying the image corresponding to the changed setting value of the at least one function.

Additionally, the executing of the operation corresponding to the identified operation command may include adjusting the state of at least one function based on the identified operation command, and displaying the image corresponding to the adjusted state of the at least one function. The executing of the operation corresponding to the identified operation command may also include executing the operation of the electronic device based on the identified operation command, and displaying the image corresponding to the operation of the electronic device.

The vehicle may be configured to determine whether the gesture input has been received by recognizing the image received by the image input in real time without the terminal being touched (410). The image input received by the image input may be a three-dimensional image. In other words, the vehicle may be configured to recognize the person (i.e., driver) in the received image and recognize the shape of the recognized person's arm and hand to determine whether the user has motioned the gesture.

The vehicle may be configured to recognize the gesture motioned by the driver and identify the operation command corresponding to the recognized gesture. More specifically, the vehicle may be configured to recognize the person (i.e., the driver) in the image received by the image input 212, recognize the face and the finger of the person (411), recognize the eyes and the pupil on the recognized face, and generate the point of the fingertip and the point of the pupil. Additionally, the vehicle may be configured to recognize the plurality of button areas of the second area of the terminal in the image. The vehicle clarifies the range of the plurality of button areas by generating points of edges of the plurality of button areas.

The vehicle may be configured to generate the straight line connecting the point of the fingertip and the point of the pupil, extend the generated straight line toward the terminal, and recognize the point where the extended straight line reaches as the virtual touch point. At this time, the vehicle may be configured to recognize the point at which the extended straight line reaches, as the first virtual touch point and identify the button corresponding to the first virtual touch point (412). The vehicle may be configured to identify the button area, to which the extended straight line is directed to, out of the plurality of button areas of the second area of the terminal, and identify the button displayed in the identified button area.

The vehicle may be configured to display the identified button differently from the other buttons (413). For example, the vehicle may highlight the image of the button (e.g., temperature button) disposed at the virtual touch point. As another example, the vehicle may enlarge the size of the image of the button disposed at the virtual touch point by the predetermined length d and display it larger than other buttons.

The vehicle may be configured to identify the operation command of the identified button and execute the operation corresponding to the identified operation command (414). The executing of the operation corresponding to the identified operation command may include changing the setting value of at least one function based on the identified operation command, and displaying the image corresponding to the changed setting value of the at least one function in the terminal. Additionally, the executing of the operation corresponding to the identified operation command may include adjusting the state of at least one function based on the identified operation command, and displaying the image corresponding to the adjusted state of the at least one function in the terminal.

The executing of the operation corresponding to the identified operation command may include executing the operation of the electronic device based on the identified operation command, and displaying the image corresponding to the operation of the electronic device in the terminal. When recognizing the virtual touch point corresponding to the gesture input by the user, the vehicle may be configured to recognize the first virtual touch point corresponding to the gesture input, identify the button corresponding to the first virtual touch point, and obtain the operation command intended by the user based on the change in the position of the virtual touch point in accordance with the change in time.

In other words, the vehicle may be configured to recognize the sliding direction based on the positional change of the virtual touch point according to the change of the time, and obtain the operation command based on the recognized sliding direction. For example, when the button corresponding to the first virtual touch point is the volume button, the vehicle may lower the volume by one level corresponding to the movement from the upper side to the lower side, and increase the volume by one level corresponding to the movement from the lower side to the upper side.

As described above, in the exemplary embodiment, since the button in the area of the terminal that has not been touched by the driver may be operated through the gesture input, the safety during traveling may be enhanced, and the convenience for the driver may be improved.

As is apparent from the above description, it may be possible to display a button of a function frequently used by a driver in the second area, in which the driver's finger does not touch, in the area of the terminal including the touch screen, and it may be possible to determine whether the button displayed in the second area is selected, through gesture recognition of the user, and thus it may be possible to improve the recognition rate for the selection of the button located at a remote location. The user may more easily operate the button located at the remote location even during operation of the vehicle. Accordingly, it may be possible to improve the convenience of the user and the safety of the vehicle.

Since the intention of the user may be recognized more accurately through the touch recognition or the gesture recognition, the performance of the function corresponding to the operation command intended by the user may be improved and the satisfaction of the user may be improved. When a user input is performed through the terminal, both planar input and spatial input may be allowed and thus an input device of the terminal having a variety of functions may be constructed.

As described above, it may be possible to improve the quality and merchantability of the terminal and the vehicle, further increase the satisfaction of the user, improve the convenience of the user and the safety of the vehicle, and secure the competitiveness of the vehicle.

Meanwhile, the disclosed exemplary embodiments may be embodied in the form of a recording medium storing instructions executable by a computer. The instructions may be stored in the form of a program code and, when executed by a processor, may generate a program module to perform the operations of the disclosed embodiments. The recording medium may be embodied as a non-transitory computer-readable recording medium. The non-transitory computer-readable recording medium includes all kinds of recording media in which instructions which can be decoded by a computer are stored. For example, there may be Read Only Memory (ROM), Random Access Memory (RAM), a magnetic tape, a magnetic disk, a flash memory, and an optical data storage device.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
a terminal configured to display buttons to be selected by a user, and receive a touch input including a touch panel as user input;
an image input configured to receive an image of the user for receiving a gesture input as the user input, and including a camera;
at least one physical button; and
a controller configured to divide an area of the terminal into a first area and a second area, determine a button selected by the user among buttons displayed in the first area based on the touch signal output by the touch input, and determine a button selected by the user among buttons displayed in the second area based on a finger image and an eye image in the image of the user,
wherein the controller is configured to identify the number of operations of the buttons displayed on the first area and the at least one physical button respectively, and control the display to display a button having the identified number of operations greater than or equal to a reference number as a shortcut button in the second area.

2. The vehicle of claim 1, wherein the controller is configured to identify the number of buttons to be displayed in the second area, divide the second area into a plurality of button areas based on the identified number of buttons to be displayed in the second area, and operate the terminal to display the divided plurality of button areas.

3. The vehicle of claim 2, wherein the controller is configured to operate the display to divide the plurality of button areas into equal sizes.

4. The vehicle of claim 1,
wherein the controller is configured to generate a point of a fingertip based on the image, generate a point of a pupil based on the image, generate a straight line connecting the point of the fingertip with the point of the pupil, determine a position corresponding to a direction in which the generated straight line is directed, and determine a physical button disposed at the determined position among the plurality of physical buttons.

5. The vehicle of claim 4, further comprising:
a plurality of light emitting elements disposed adjacent to each of the plurality of physical buttons,
wherein the controller is configured to adjust lighting of a light emitting element disposed adjacent to the determined physical button.

6. The vehicle of claim 1, wherein, when determining the button selected by the user among the buttons displayed in the second area, the controller is configured to generate a point of a fingertip based on the finger image, generate a point of a pupil based on the eye image, generate a straight line connecting the point of the fingertip with the point of the pupil, determine a position corresponding to a direction in which the generated straight line is directed, and determine the button disposed at the determined position.

7. The vehicle of claim 1, wherein the controller is configured to recognize a motion range of an arm and a hand of the user based on the image and set a rich zone based on the recognized motion range, set an area corresponding to the set rich zone as the first area of the terminal, and set the remaining area of the terminal as the second area of the terminal.

8. The vehicle of claim 1, wherein the controller is configured to operate the terminal to display an image of the determined button among the buttons displayed in the second area larger than an image of the remaining buttons displayed in the second area.

9. The vehicle of claim 1, wherein the controller is configured to operate the terminal to display a color of an image of the determined button among the buttons displayed in the second area differently from a color of an image of the remaining buttons displayed in the second area.

10. The vehicle of claim 1, wherein the camera includes a three-dimensional camera configured to obtain a three-dimensional image.

11. The vehicle of claim 1, wherein the image input is provided separately from the terminal.

12. The vehicle of claim 1, further comprising:
a plurality of electronic devices configured to perform at least one function,
wherein the controller is configured to identify an operation command of the determined button and execute operation of at least one electronic device of the plurality of electronic devices based on the identified operation command.

13. The vehicle of claim 1, wherein the terminal is disposed on a dashboard and is extended from a position adjacent to a driver's door to a position adjacent to a passenger's door.

14. A terminal, comprising:
a display configured to display a plurality of buttons selectable by a user;
a touch input disposed integrally on a display surface of the display, configured to generate a touch signal at a touched point and output the generated touch signal, and including a touch panel;
an image input configured to receive an image of the user, and including a camera;
at least one physical button; and
a controller configured to divide an area of the display into a first area and a second area, determine a button selected by the user among buttons displayed in the first area based on the touch signal output by the touch input, and determine a button selected by the user among buttons displayed in the second area based on a finger image and an eye image in the image of the user,
wherein the controller is configured to identify the number of operations of the buttons displayed on the first area and the at least one physical button respectively, and control the display to display a button having the identified number of operations greater than or equal to a reference number as a shortcut button in the second area.

15. The terminal of claim 14, wherein, when determining the button selected by the user among the buttons displayed in the second area, the controller is configured to generate a point of a fingertip based on the finger image, generate a point of a pupil based on the eye image, generate a straight line connecting the point of the fingertip with the point of the pupil, determine a position corresponding to a direction in which the generated straight line is directed, and determine the button disposed at the determined position.

16. The terminal of claim 14, wherein the controller is configured to recognize a motion range of an arm and a hand of the user based on the image and set a rich zone based on the recognized motion range, and divide the area of the display into the first area and the second area based on the set rich zone.

17. The terminal of claim 14, wherein the controller is configured to operate the display to display an image of the determined button among the buttons displayed in the second area larger than an image of the remaining buttons displayed in the second area.

18. The terminal of claim 14, wherein the controller is configured to operate the display to display a color of an image of the determined button among the buttons displayed in the second area differently from a color of an image of the remaining buttons displayed in the second area.

19. The terminal of claim 14, wherein the controller is configured to divide the second area into a plurality of button areas based on the number of buttons to be displayed in the second area, identify the number of operations of each button to be displayed in the second area, and arrange the buttons to be displayed in the second area in the plurality of button areas based on the number of operations of each button.

20. The terminal of claim 14, wherein the image input includes a three-dimensional camera configured to obtain a three-dimensional image.

21. A method for controlling a vehicle, comprising:
recognizing, by a controller, a motion range of an arm and a hand of a user based on an image received by an image input including a camera;
setting, by the controller, a rich zone based on the recognized motion range;
setting, by the controller, an area corresponding to the set rich zone as a first area of a terminal;
setting, by the controller, the remaining area of the terminal as a second area of the terminal;
displaying, by the controller, a plurality of buttons selected by the user in the first and second areas, respectively;

determining, by the controller, a button selected by the user among buttons displayed in the first area based on a touch signal received by a touch input including a touch panel, and operating at least one electronic device based on an operation command of the determined button in the first area;

determining, by the controller, a button selected by the user among buttons displayed in the second area based on a finger image and an eye image in the image received by the image input, and operating at least one electronic device based on an operation command of the determined button in the second area;

identifying, by the controller, the number of operations of the buttons displayed on the first area and at least one physical button respectively, and controlling, by the controller, the terminal to display a button having the identified number of operations greater than or equal to a reference number as a shortcut button in the second area.

22. The method of claim 21, wherein determining a button selected by the user among buttons displayed in the second area includes:

generating, by the controller, a point of a fingertip based on the image;

generating, by the controller, a point of a pupil based on the image;

generating, by the controller, a straight line connecting the point of the fingertip with the point of the pupil;

determining, by the controller, a position corresponding to a direction in which the generated straight line is directed; and determining, by the controller, a button disposed at the determined position.

23. The method of claim 21, further comprising:

displaying, by the controller, an image of the determined button among the buttons displayed in the second area differently from images of the remaining buttons.

* * * * *